E. LEHR.
CONTROL APPARATUS FOR INDUCTION MOTORS.
APPLICATION FILED SEPT. 10, 1915.
1,303,337.
Patented May 13, 1919.
2 SHEETS—SHEET 1.
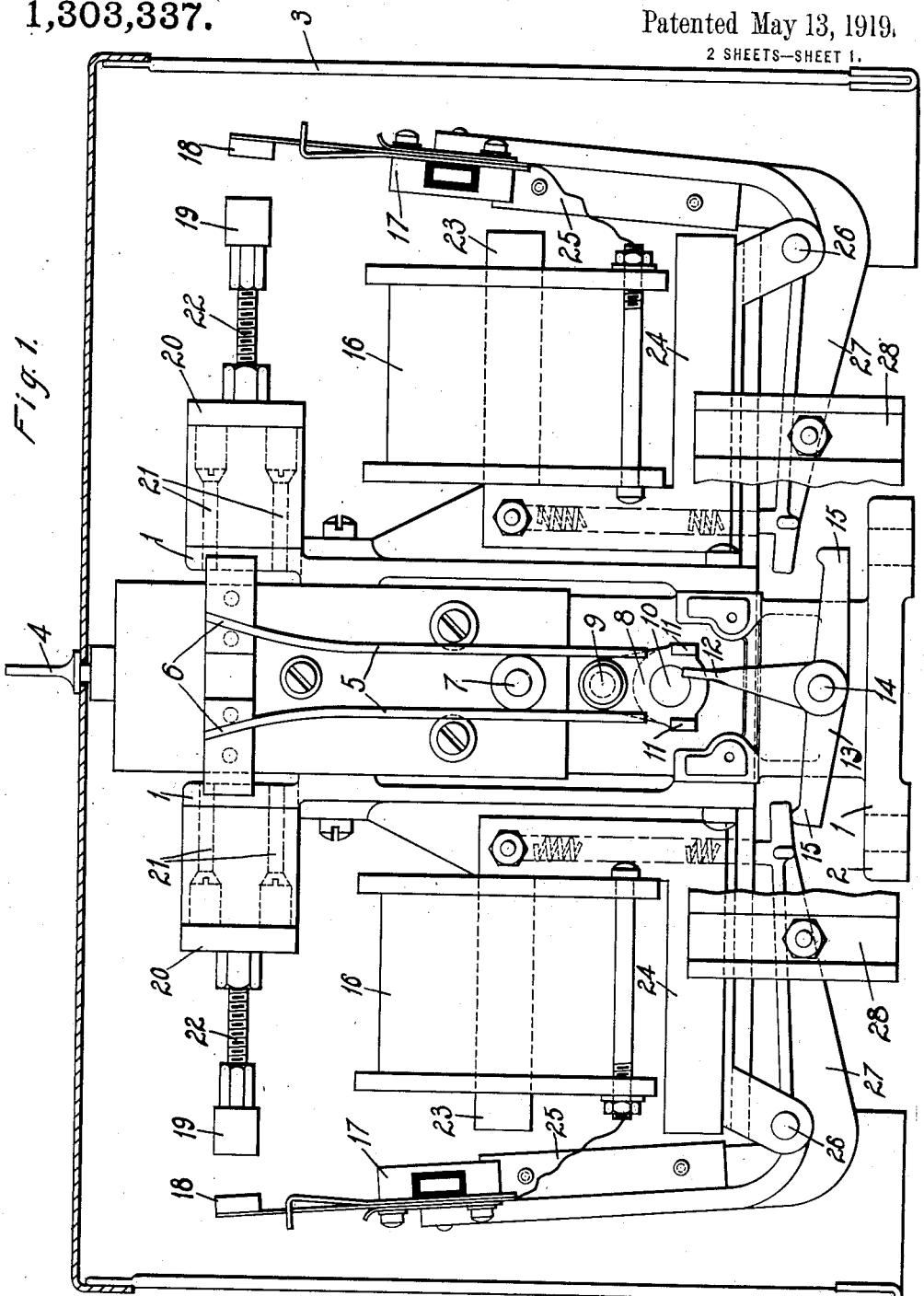
WITNESSES:
R. J. Fitzgerald
Geo. W. Hansen.
INVENTOR
Edwin Lehr.
BY
Wesley G. Carr
ATTORNEY

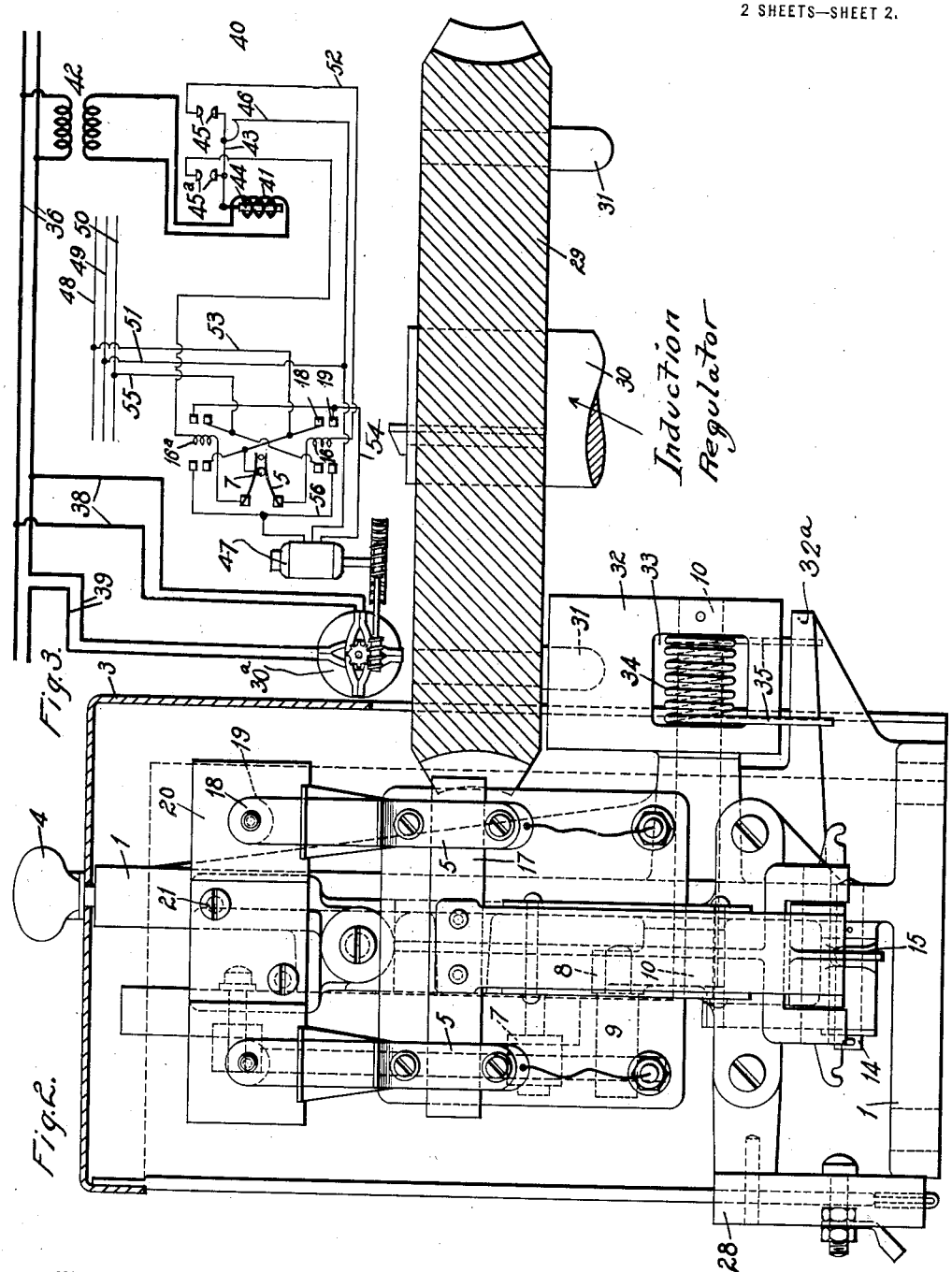

UNITED STATES PATENT OFFICE.

EDWIN LEHR, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL APPARATUS FOR INDUCTION-MOTORS.

1,303,337. Specification of Letters Patent. Patented May 13, 1919.

Application filed September 10, 1915. Serial No. 50,090.

*To all whom it may concern:*

Be it known that I, EDWIN LEHR, a citizen of the United States, and a resident of Pittsburgh, in the county of Allegheny and State of Pennsylvania, have invented a new and useful Improvement in Control Apparatus for Induction-Motors, of which the following is a specification.

My invention relates to automatic induction regulators, and it has special reference to the control apparatus employed in connection therewith.

More particularly, my invention refers to a relay device adapted to be associated with an induction regulator in order to perform the functions heretofore performed by a combination comprising a so-called "limit switch" and an auxiliary relay device.

It is usual to adjust the relative position between the movable and stationary elements of an induction regulator by means of a motor acting through a worm and wheel mechanism, the latter being secured to the rotatable axle of the regulator movable element. The operation of the motor is controlled indirectly by means of a special form of relay commonly known as a contact-making voltmeter. Variations in voltage on the feeder associated with the induction regulator cause the voltmeter to close one or the other of two electrical circuits and thereby cause the motor to drive the regulator movable element in one direction or the other for the purpose of restoring the voltage of the feeder to the desired normal value. When excessive fluctuations in the voltage of the feeder occur, for which the regulator is unable to compensate, it is necessary to preclude further movement of the movable element of the regulator after the maximum allowable movement thereof has been completed. To this end, a limit-switch mounted on the regulator casing and controlled by the wheel of the motor drive mechanism, in combination with a separately-mounted auxiliary relay device, has been commonly used.

An object of my present invention is to provide in a unitary structure a relay device for precluding movement of the rotatable member of an induction regulator beyond certain predetermined maximum positions. At the same time, the operation of the motor actuating the said rotatable member is controlled by the aforementioned relay device, in conjunction with a contact-making voltmeter, the latter selectively energizing the former to effect rotation of the motor in the proper direction. In addition thereto, means may be incorporated for mechanically disengaging the coöperative contact members of the relay device providing a tendency exists for them to adhere to one another after their energizing electromagnet has been disconnected from circuit.

For a better understanding of the nature and scope of my invention, reference may be had to the following description and the accompanying drawings in which Figure 1 is a view, in elevation, of a relay device embodying a form of my invention; Fig. 2 is a side view of the structure shown in Fig. 1; and Fig. 3 is a diagrammatic representation of an electrical system of distribution comprising an induction type regulator equipped with a relay device that is built in accordance with my invention.

Referring to Figs. 1 and 2, a frame 1, supporting the contact members and electromagnets embodied in my relay device, is provided with flanges 2 which permit the relay device to be mounted upon the regulator casing. A casing 3, held in engagement with the upper portion of the frame 1 by means of a thumb screw 4, surrounds the relay device in order to adequately protect it from injury.

The relay device proper comprises a pair of substantially vertical and parallel resiliently mounted contact members 5 that are secured at their upper ends to insulated terminals 6. The spring action inherent in the members 5 firmly presses their lower ends in engagement with a conducting member 7 that is interposed between them. A crank mechanism 8, comprising a crank pin 9 and rotatably mounted upon a shaft 10, is so positioned that the crank pin 9 may engage either one of the resilient contact members 5 depending upon the direction of rotation imparted by the shaft 10. The lower portion of the crank mechanism 8 is provided with two spaced laterally projecting flange members 11 between which is inserted an upwardly extending member 12 of a rocker arm 13 which, in turn, is pivoted at 14 and provided with oppositely extending arms 15. It will be noted that movement is imparted to the rocker arm 13 by means of the upwardly-extending member 12 that is adapted to engage either one of the laterally projecting flanges 11 formed on the crank mechanism 8. The said parts constitute the central structure of my relay device and control the operation of the other elements symmetrically disposed on both sides thereof.

On each side of the crank mechanism 8 and the resilient contact members 5 there are disposed an electromagnet 16, a coöperative armature element 17, to which is attached movable contact members 18, and stationary contact members 19 that are adapted to engage therewith.

As shown in Fig. 2, the contact members 19 are mounted upon blocks 20 that are secured to the frame 1 by means of screws 21. A threaded shank 22 permits of the making of adjustments of the contact members 19.

The electromagnet 16 surrounds an arm 23 of a divided core member 24 one leg 25 of which is mounted upon the bell-crank armature 17. When the electromagnet 16 is energized, as will be hereinafter explained, the armature 17 rotates about a pivot 26, and, as the armature 17 is actuated, the contact members 18 and 19 engage, thereby closing an auxiliary circuit through a motor shown at 47 in Fig. 3, that, in turn, controls the relative movement of the rotatable element of the induction regulator. The bell-crank armature 17 comprises an arm 27 that, in turn, is adapted to engage the corresponding arm 15 of the rocker arm 13.

Electrical connections to the relay device are made through a terminal board 28, portions only of which are shown in Fig. 1.

To more fully understand the operation of my device, reference may now be had particularly to Fig. 2 wherein a wheel 29 is shown which, as above mentioned, is keyed to a shaft 30 to which the movable element of the regulator 30ª of Fig. 3 is attached. Rotation of the wheel 29 is effected by means of a worm that, in turn, is operated by a motor 47, shown in Fig. 3. On the under side of the wheel 29 are two diametrically-disposed pins 31 one of which is shown as being on the rear side of a cam member 32 that is secured to the shaft 10 of the crank mechanism 8 of Fig. 1. The cam 32 is provided with a central opening 33 to permit of the insertion of a tensional element or spring 34 which embraces the shaft 10. The spring 34 is provided with two downwardly-extending portions 35 which engage opposite sides of the cam 32 and project below an extension 32ª of the frame 1, thereby tending to hold the cam 32 in an upright position, as shown. As the wheel 29 revolves, one of the pins 31 may engage the cam 32, thereby effecting rotation of the cam which, in turn, rotates the crank mechanism 8 and effects engagement between one or the other of the tensional elements 5 and the pin 9. On further rotation of the cam member 32, the resilient member 5 engaged by the pin 9 is disconnected from the contact member 7, thereby interrupting an electrical circuit. Further rotation of the cam member 32 establishes engagement between the upwardly projecting arm 12 of the rocker arm 13 and one or the other of the flange members 11 of the crank mechanism 8. The rocker arm 13 is then actuated to effect engagement with the arm 27 of that armature 17 which is attracted by the selected electromagnet 16. After this latter engagement has been effected, the rocker arm 13 exerts an upward pressure upon the arm 27, thereby mechanically disengaging the contact members 18 and 19, providing they have a tendency to adhere to one another.

When the pin 31 of the wheel 29 engages the cam member 32, the movable element of the regulator has reached its predetermined maximum position, and it is essential that the operating motor be disconnected from circuit in order to bring the movable element to rest. Consequently, when the cam 32 rotates, it first disengages the proper resilient member 5 and the conducting member 7 which, as will be shown in Fig. 3, opens the electrical circuit through the selected electromagnet 16. On deënergization of the electromagnet 16, the armature 17 should fall to its open position, but occasionally the contact members 18 and 19, through which the circuits of the motor 47 are completed, "freeze" to each other, thereby necessitating their being mechanically disengaged in order to deënergize the motor 47. To this end, the rocker arm 13 is actuated by the crank mechanism 8 in order to mechanically force the armature 17 to its open position, thereby opening the circuit through the contact members 18 and 19 which, in turn, disconnects the operating motor 47 from its energizing circuit.

In Fig. 3, a feeder comprising mains 36 and subject to power fluctuations is adapted to be regulated by means of an induction regulator 30ª one element of which is connected in shunt to the mains 36 by means of leads 38, and the other element of which is connected in series with one of said mains by means of leads 39. A contact-making voltmeter 40 of the kind well known in the art, has its energizing coil 41 excited through the secondary winding of a voltage transformer 42. By means of a rocker arm 43 which, in turn, is controlled by a plunger magnet 44 influenced by the voltage coil 41, those particular contact members 45 are selected whereby the movable element of the regulator 30ª may be rotated in the desired direction so as to reëstablish normal conditions upon the feeder circuit. The contact members 45, in conjunction with a common lead 46 of the contact-making voltmeter 40, and the relay device of my invention establish circuits through the operating motor 47 that actuates the movable element of the regulator. An auxiliary three-phase circuit comprising leads 48, 49 and 50, is connected through the relay device of my invention and the contact-making voltmeter 40 to the operating motor 47, substantially as shown in Fig. 3.

To illustrate the operation of my relay device, assume that the contact members 45 are brought into engagement by reason of a decrease in the voltage of the feeder circuit 36. A circuit is thereby established through the three-phase lead 49, a conductor 51, the conductor 46, the contact members 45, a conductor 52, the energizing winding of the electromagnet 16, the resilient contact member 5, the conducting member 7, a conductor 53 and the lead 48 of the three-phase supply. The electromagnet 16, thus being energized, effects engagement between the two pairs of contact members 18 and 19, one pair of which, in turn, establishes an electrical circuit through the motor 47 by connecting the lead 53 to a motor lead 54 and the other pair of which connects a lead 55 from the three-phase main 50 to a lead 56, the latter being connected to the motor 47. Since the motor is energized, it will be rotated in a predetermined direction. Similarly, if the contact members 45$^a$ of the contact-making voltmeter 40 were brought into engagement, the electromagnet 16$^a$ of the relay device would be energized which, in turn, would excite the motor 47 in such a manner as to effect rotation thereof in a direction opposite to that indicated above. It will be seen that the contact-making voltmeter 40 selectively energizes the motor 47 so as to rotate the movable element of the regulator in the proper direction to restore normal voltage on the feeders 36.

From the foregoing, it will be apparent that when one of the resilient contact members 5 is disengaged from the contact member 7, the associated electromagnet 16 or 16$^a$ is deënergized, as above mentioned. As a result, the contact members 18 and 19, through which the circuit of the motor 47 is completed, are disengaged ordinarily, thereby deënergizing the motor 47 in order to bring the regulator movable element to rest. However, if the contact members 18 and 19 adhere or "freeze" to each other, the motor continues to rotate until they are mechanically disengaged by reason of the engagement effected between the rocker arm 13 and the pivoted armature 17. The rocker arm 13 also prevents both bell-crank armatures 17 from simultaneously effecting engagement between all of the contact members 18 and 19, if, for any reason, the contact members associated with a deënergized electromagnet 16 should be held in mechanical engagement while the other contact members tend to be brought into engagement on the energization of the other electromagnet 16. This latter feature is not essential to the operation of my relay device, and is incorporated as a protective means only. It will be observed that my relay device performs the functions of both an auxiliary relay and a limit switch through the operation of the electromagnets 16 and their associated elements and through the operations of the resilient contact members 5, the crank mechanism 8 and the cam 32, respectively.

While I have shown one embodiment of my invention, it will be apparent to those skilled in the art that many modifications may be made therein without departing from the spirit and scope of the appended claims.

I claim as my invention:

1. A relay comprising coöperating contact members, electromagnets for effecting selective engagement of the contact members, means for deënergizing said electromagnets under predetermined conditions whereby said contact members may be automatically disengaged, and mechanical means for disengaging coöperating contact members in case they continue in contact after the deënergization of the associated electromagnet, said mechanical means being operated by another one of said electromagnets and by the means for deënergizing the electromagnets.

2. A relay comprising coöperating contact members, electromagnets for effecting selective engagement of said contact members, a switching mechanism inserted in the circuits thereof, means for actuating said switching mechanism to interrupt the circuit of one or the other of the electromagnets under predetermined conditions, and additional means actuated by said first means whereby separation of the contact members is insured if they continue in engagement after the interruption of the circuit of the selected electromagnet.

3. A relay comprising at least two pairs of coöperating contact members, corresponding contact members of each pair being mounted upon bell-crank armatures, electromagnets for actuating the bell-crank armatures, means for interrupting the circuits of the said electromagnets under predetermined conditions, and mechanical means operated by said circuit-interrupting means for reversing the movement of the bell-crank armatures thereby forcibly disengaging the coöperating contact members after said electromagnets have been deënergized.

4. A relay device comprising reversing switches, electromagnets for actuating said switches, means for selectively energizing said electromagnets, means for interrupting the circuits of said magnets, and means controlled by said circuit-interrupting means for forcibly disengaging the coöperating contact members under predetermined conditions.

5. A relay device comprising adjacent resiliently-mounted conducting members, a crank shaft to vary the relative positions thereof, electromagnets having their excitation controlled by the position of said contact members, other contact members influenced by the excitation of said electromagnets for controlling an auxiliary circuit, means for effecting rotation of said crank shaft to deënergize said electromagnets, and means for mechanically disengaging said second contact members subsequent to the deënergization of said electromagnets.

6. A relay device comprising adjacent resiliently-mounted contact members, a movable element adapted to engage one or the other thereof, electromagnets having their excitation controlled by said contact members, other contact members for controlling an auxiliary circuit when one of said electromagnets is energized, means for actuating said movable element whereby one of said resiliently-mounted contact members is displaced to deënergize one of the electromagnets, and additional means for mechanically disengaging said second contact members when said movable element advances beyond a predetermined position.

7. The combination with a circuit having power fluctuations therein, an induction regulator associated therewith, and a motor for adjusting the position of the movable member thereof, of a primary relay responding to the fluctuations in the power circuit, and a secondary relay selectively energized thereby for controlling the said direction of rotation of said motor, means associated with the movable member of the regulator for deënergizing the secondary relay and for mechanically disengaging the contact members thereof when the said movable member of the regulator travels beyond predetermined positions.

8. The combination with a circuit having power fluctuations, an induction regulator therefor, and a motor for adjusting the position of the movable member of the induction regulator, of a primary relay responding to the fluctuations in the power circuit, and a secondary relay selectively energized thereby to effect rotation of said motor in the proper direction, and means associated with the movable member of the regulator for deënergizing said secondary relay when said movable member occupies predetermined positions, and additional means for mechanically disengaging the contact members of the secondary relay when the movable regulator member travels beyond the aforementioned predetermined positions.

9. The combination with an electric circuit subject to voltage fluctuations, and a regulating device tending to compensate for the voltage fluctuations therein, of electromagnetic means for selectively controlling said regulating device in order to restore normal voltage in the circuit, said means responding to voltage fluctuations that are both in excess and less than the normal voltage of the circuit, and mechanical means for rendering said electromagnetic means inactive if the latter continues to control said regulating device after normal voltage has been restored in the electric circuit.

10. The combination with an electric circuit to be regulated, and a regulator therefor, of electromagnetic means for selectively controlling the direction of motion of said regulator, means operating to deënergize said electromagnetic means when the regulator has undergone a predetermined movement, and additional means controlled by said deënergizing means for insuring the discontinuance of the movement of the regulator.

11. The combination with an electric circuit to be regulated, a regulator for controlling the electrical conditions obtaining therein, of means for operating said regulator, reversing switches for controlling the direction of motion of said regulator operating means, means responsive to the electrical conditions of the circuit for controlling the reversing switches, and interlocking means between the reversing switches.

12. The combination with an electric circuit to be regulated, a regulator for controlling electrical conditions obtaining therein, of means for operating said regulator, reversing switches for controlling the direction of motion of said regulator operating means, means responsive to the electrical conditions of the circuit for controlling the reversing switches, and means for positively opening and interlocking the reversing switches.

In testimony whereof, I have hereunto subscribed my name this 31st day of Aug. 1915.

EDWIN LEHR.